United States Patent
Clark et al.

(10) Patent No.: US 8,448,013 B2
(45) Date of Patent: May 21, 2013

(54) FAILURE-SPECIFIC DATA COLLECTION AND RECOVERY FOR ENTERPRISE STORAGE CONTROLLERS

(75) Inventors: Brian Dow Clark, Tucson, AZ (US); Juan Alonso Coronado, Tucson, AZ (US); Christina Ann Lara, Tucson, AZ (US); Lisa R. Martinez, Tucson, AZ (US); Phu Nguyen, Tucson, AZ (US); Beth Ann Peterson, Tucson, AZ (US); Jayson Elliott Tsingine, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 12/355,944

(22) Filed: Jan. 19, 2009

(65) Prior Publication Data

US 2010/0185895 A1    Jul. 22, 2010

(51) Int. Cl.
*G06F 11/00* (2006.01)
(52) U.S. Cl.
USPC ............... 714/4.11; 714/4.2; 714/43; 714/23; 714/42
(58) Field of Classification Search ........................ None
See application file for complete search history.

(56) References Cited

U.S. PATENT DOCUMENTS

| | | | |
|---|---|---|---|
| 5,968,182 A * | 10/1999 | Chen et al. ................. | 714/5 |
| 6,199,179 B1 | 3/2001 | Kauffman et al. | |
| 6,243,833 B1 * | 6/2001 | Hitchcock et al. ............... | 714/33 |
| 6,438,661 B1 | 8/2002 | Beardsley et al. | |
| 6,490,659 B1 | 12/2002 | McKean et al. | |
| 6,880,113 B2 * | 4/2005 | Anderson et al. ............... | 714/45 |
| 6,988,171 B2 | 1/2006 | Beardsley et al. | |
| 2002/0138695 A1 | 9/2002 | Beardsley et al. | |
| 2002/0188711 A1 * | 12/2002 | Meyer et al. ................... | 709/223 |
| 2006/0230306 A1 * | 10/2006 | Richards et al. ................... | 714/7 |
| 2007/0168760 A1 * | 7/2007 | Ko et al. .......................... | 714/49 |
| 2007/0240018 A1 * | 10/2007 | Nalawadi et al. ............... | 714/23 |
| 2007/0283081 A1 * | 12/2007 | Lasser ........................... | 711/103 |

OTHER PUBLICATIONS

Sutton, AJ, Tracking Register, IBM Technical Document Bulletin (TDB), Jul. 1, 1984, TDB Jul. 1984, p. 976.

* cited by examiner

*Primary Examiner* — Scott Baderman
*Assistant Examiner* — Jason Bryan
(74) *Attorney, Agent, or Firm* — Nelson and Nelson; Daniel P. Nelson; Alexis V. Nelson (57) ABSTRACT

A method, apparatus, and computer program product for handling a failure condition in a storage controller is disclosed. In certain embodiments, a method may include initially detecting a failure condition in a storage controller. The failure condition may be associated with a specific host and a specific storage device connected to the storage controller. The method may further include determining a failure ID associated with the failure condition. Using the failure ID, en entry may be located in a data collection and recovery table. This entry may indicate one or more data collection and/or recovery processes to execute in response to the failure condition. The method may then execute the data collection and/or recovery processes indicated in the entry. While executing the data collection and/or recovery processes, connectivity may be maintained between hosts and storage devices not associated with the failure condition.

20 Claims, 6 Drawing Sheets

FAILURE-SPECIFIC DATA COLLECTION AND RECOVERY FOR ENTERPRISE STORAGE CONTROLLERS

BACKGROUND

1. Field of the Invention

This invention relates to enterprise storage controllers, and more particularly to apparatus and methods for collecting data and recovering from failures in enterprise storage controllers.

2. Background of the Invention

In enterprise storage controllers, such as the IBM DS8000™ storage controllers, a "warmstart" may be used as both a debug mechanism and a recovery method. The warmstart may initiate a state-save operation to collect state-save data. This state-save data may contain data structures that are deemed necessary to analyze the problem or condition that necessitated the warmstart. In addition, the state-save data may contain component-specific microcode path traces and general traces. Component-specific traces may be saved in separate buffers. General traces, which record all the activity of each defined processor, may also be saved in separate buffers.

The warmstart itself may allow the storage controller to reinitialize certain data structures, rebuild linked lists, and restore the storage controller to a more known state. During the warmstart, there are periods of time where I/O may be blocked and therefore must be redriven. Accordingly, the duration of the warmstart should be as short as possible to minimize the impact on the storage system. This is particularly important in applications such as time-sensitive banking and reservation systems.

A warmstart may be automated for both debug and recovery when the storage controller detects certain conditions, such as microcode detected errors (MDEs) and microcode logic errors (MLEs). In certain cases, a warmstart may be initiated by host software or applications. For example, a host may send a state-save command to the storage controller when the host detects certain conditions that would warrant collecting data at the storage controller. Typically, after an application fails, the host will send a state-save command to the volume that was used by the application. In addition, a user can manually force a warmstart on the storage controller command line at any time.

When a warmstart occurs, the state-save data that is collected at a customer site may be transmitted to a customer support center. The state-save data may be very large, possibly hundreds of megabytes. As a result, it can take several hours for the state-save data to be successfully transmitted to the customer support center. Unfortunately, the time spent in transit may delay support and problem analysis. For a customer-critical problem, the problem may reoccur at the storage controller while the state-save data is in transit and before the customer support center has a chance to understand the problem or provide an action plan. For a customer, this situation can be very aggravating. The impact of the problem can also increase as the problem reoccurs.

Once the state-save data arrives at a customer support center, the data may be analyzed to determine the cause of the problem. Many times, only a small amount of the state-save data is needed to determine what caused the problem. Thus, much of the data may be unneeded, and much of the delay associated with the unneeded data may be unnecessary. Furthermore, much of the resources, time, and effort required to collect and transmit the state-save data may be wasted.

Many of the problems that occur in the storage controller are typically related to a host/device relationship. This is because a storage controller may be device-centric, meaning that a host (e.g., a open system or mainframe server) may access a specific device (e.g., a disk drive, a tape drive, etc.) to perform I/O operations (i.e., reads and writes) to that device. Consequently, only data directly related to the problem (e.g., data related to a host/device relationship, data related to a specific piece of hardware with a problem, data related to events surrounding an MDE or MLE, or the like) may be needed to analyze the problem. For example, data may be needed with respect to the state of device data structures, the data path used for the host-to-device communications, or the like. The data needed may include data structures for several components, where most or all of the data structures are related to a specific device/host relationship.

Other issues may also arise when a warmstart collects state-save data. For example, when a state save occurs, even though the problem is related to a specific host and/or device, all devices connected to the storage controller may become unavailable to all hosts attached to the storage controller. This means I/O activity is suspended for all hosts and all devices during the warmstart. This is a heavy penalty to pay for an isolated problem between a specific host and device.

It has also been observed that a warmstart recovery may fail for reasons unrelated to the original problem. For instance, since all I/O activity may be suspended during the warmstart, all data queued in cache may need to be destaged to the storage devices (e.g., disk drives). If the queue of data in the cache is huge, this may cause the warmstart to take longer than normal. In the worse case scenario, this delay may cause another warmstart. In such cases, the storage controller may be unable to recover on its own.

In view of the foregoing, what are needed are apparatus and methods to reduce the number and/or frequency of warmstarts that occur in enterprise storage controllers. Further needed are apparatus and methods to more closely tailor data collection and recovery processes on specific failures and host/device relationships, thereby allowing I/O to continue between hosts and storage devices unrelated to the problem. Yet further needed are apparatus and methods to reduce the amount of data collected in association with a failure condition, thereby reducing the time and resources needed to analyze the data or transmit the data to a customer support center.

SUMMARY

The invention has been developed in response to the present state of the art and, in particular, in response to the problems and needs in the art that have not yet been fully solved by currently available apparatus and methods. Accordingly, the invention has been developed to provide improved apparatus and methods for handling failure conditions in storage controllers. The features and advantages of the invention will become more fully apparent from the following description and appended claims, or may be learned by practice of the invention as set forth hereinafter.

Consistent with the foregoing, a method for handling a failure condition in a storage controller is disclosed herein. In certain embodiments, such a method may include initially detecting a failure condition in a storage controller. The failure condition may be associated with a specific host and specific storage device connected to the storage controller. The method may further include determining a failure ID associated with the failure condition. Using the failure ID, an entry may be located in a data collection and recovery table. This entry may indicate one or more data collection and/or recovery processes to execute in response to the failure condition. The method may further include executing the data collection and/or recovery processes indicated in the entry. While executing the data collection and/or recovery processes, I/O activity between hosts and storage devices not associated with the failure condition may be maintained.

In selected embodiments, the method may further include monitoring the number of times the failure condition occurs. In the event the number of times exceeds a threshold value, the method may execute a more drastic recovery process such as a warmstart or failover. In certain embodiments, the method may be designed to execute a pre-data-collection process prior to and/or while executing the data collection process. For example, the pre-data-collection process may cause a storage device associated with the failure condition to return a busy indicator in response to I/O from any host.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer program product embodied in any tangible medium of expression having computer-usable program code stored in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
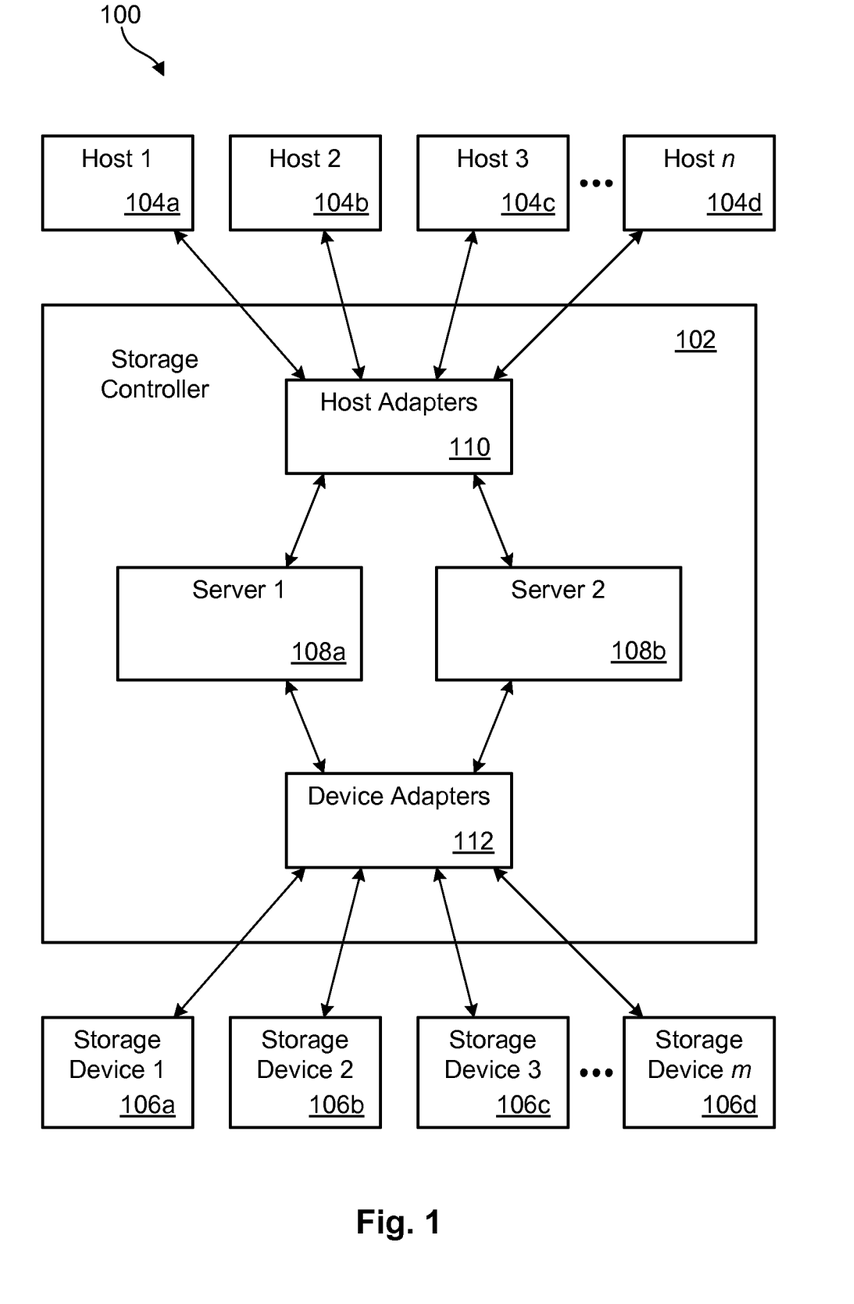
FIG. 1 is a high-level block diagram showing one embodiment of a system comprising a storage controller, multiple hosts, and multiple storage devices.

Referring to FIG. 1, one embodiment of a system 100 comprising a storage controller 102, one or more host devices 104a-d, and one or more storage devices 106a-d is illustrated. In general, the storage controller 102 may enable one or more hosts 104a-d (e.g., open system and/or mainframe servers) to access (i.e., read or write) data in one or more storage devices 106a-d (e.g., disk drives, tape drives, etc.). In selected embodiments, the storage controller 102 may include one or more servers 108a, 108b. The storage controller may also include host adapters 110 and device adapters 112 to enable the hosts 104a-d and storage devices 106a-d to communicate with the storage controller 102. The servers 108a, 108b may provide redundancy to ensure that data is always available to the hosts 104a-d. Thus, when one server 108a fails, the other server 108b may remain functional to ensure that I/O is able to continue between the hosts 104a-d and the storage devices 106a-d. This process may be referred to as a "failover."

One example of a storage controller 102 having an architecture similar to that illustrated in FIG. 1 is the IBM DS8000™ enterprise storage controller. The DS8000™ is a high-performance, high-capacity storage controller providing disk storage that is designed to support continuous operations. DS8000™ series models use IBM's POWER5™ servers 108, which are integrated with IBM' sirtualization engine technology. The virtualization engine provides a partitioning capability that allows the server's resources and storage resources to be divided up to do different tasks.

Nevertheless, embodiments of the invention are not limited to the IBM DS8000™ enterprise storage controller, but may include any comparable or analogous storage system, regardless of the manufacturer, product name, or components or component names associated with the system. Furthermore, any system that could benefit from one or more embodiments of the invention is deemed to fall within the scope of the invention. Moreover, apparatus and methods in accordance with the invention may be used with any storage system that exhibits the same issues or problems disclosed herein. Such systems are also deemed to fall within the scope of the present invention. Thus, the IBM DS8000™ is presented only by way of example and is not intended to be limiting.

Figure 2:
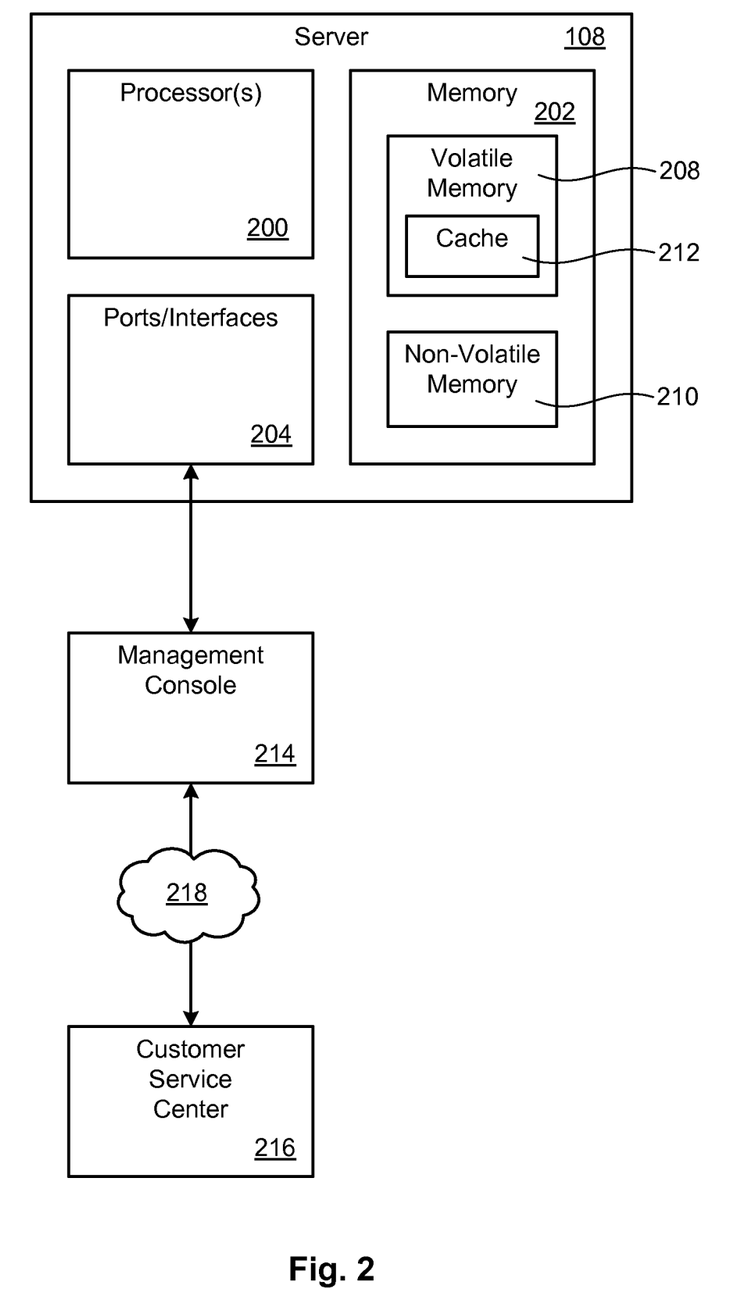
FIG. 2 is a high-level block diagram showing the internal components of one embodiment of a server in the storage controller.

Referring to FIG. 2, in selected embodiments, each server 108 may include one or more processors 200 (e.g., an n-way symmetric multiprocessor), memory 202, and various ports 204 and/or interfaces 204. The memory 202 may include volatile memory 208 (e.g., RAM) as well as non-volatile memory 210 (e.g., ROM, EPROM, EEPROM, hard disks, flash memory, etc.). In selected embodiments, the volatile memory 208 may include a cache 212. Whenever a host 104 performs a read operation, the servers 108 may fetch data from the storages devices 106 and save it in the cache 212 in the event it is required again. If the data is requested again by a host 104, the server 108 may fetch the data from the cache 212 instead of fetching it from the storage device 106, saving both time and resources.

The volatile memory 208 and non-volatile memory 210 may store software modules that run on the processor(s) 200 and are needed to access data in the storage devices 106. The servers 108 may host at least one instance of these software modules, which collectively may also be referred to as a "server," albeit in software form. These software modules may manage all read and write requests to logical volumes in the storage devices 106.

In selected embodiments, a server 108 may communicate with a management console 214. The management console 214 may be used to monitor, manage, and configure the server 108, as well as notify a user and/or a customer service center 216 when the storage controller 102 requires service. For example, the management console 214 may be used to configure and manage logical partitions in the storage devices 106, as well as monitor and identify hardware/software problems in the server 108. In selected embodiments, the management console 214 is a dedicated workstation or computer that provides a GUI interface to configure the storage controller 102 and storage devices 106 in a desired manner. The management console 214 may act as a focal point for a service representative to determine an appropriate service strategy for the storage controller 102. In selected embodiments, the management console 214 may be connected to a network 218 to enable centralized management of the storage controller 102 from a remote location.

Figure 3:
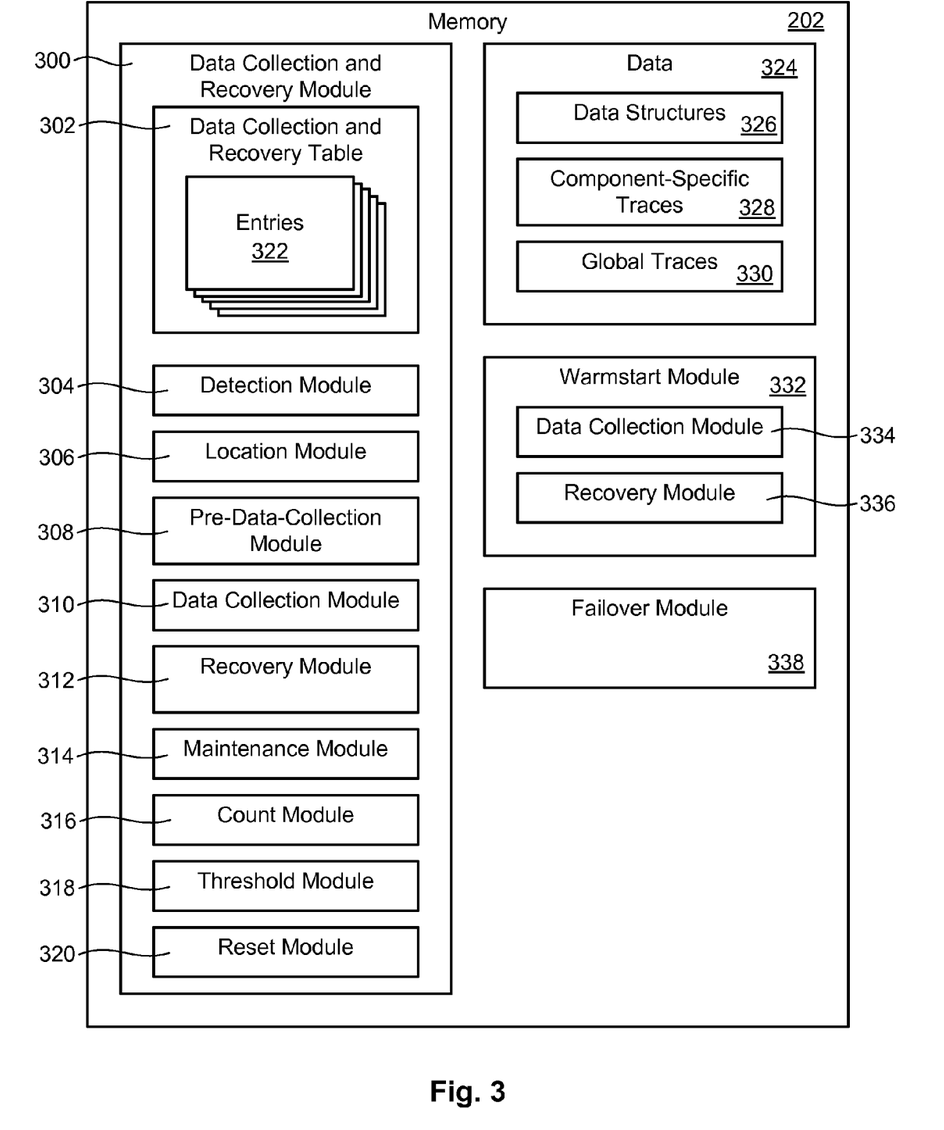
FIG. 3 is a high-level block diagram showing various software modules that may be stored in the server's memory.

Referring to FIG. 3, in selected embodiments, one or more modules for performing various operations in accordance with the invention may be stored in the memory 202 of the servers 108. In selected embodiments, these modules may include a data collection and recovery module 300 for performing failure-specific data collection and recovery processes in the event a failure occurs in a server 108. A "failure" is defined broadly herein to include any failure, error, problem, or event that occurs in a host device 104, the storage controller 102, or a storage device 106 where it may be desirable to execute data collection and/or recovery processes in the storage controller 102.

As previously mentioned, conventional data collection and recovery processes may involve performing a "warmstart" in a server 108 when a failure or error condition occurs. This warmstart may initiate a state-save operation that collects data in order to analyze the problem or condition that necessitated the warmstart. The warmstart may also execute various recovery processes after the state-save data is collected.

Unfortunately, when a warmstart occurs, all storage devices 106 connected to the storage controller 102 may become unavailable to all hosts 104 attached to the storage controller 102. This is a heavy penalty to pay for an isolated problem between a specific host 104 and a specific device 106. The warmstart may also collect more data than is actually needed to analyze and resolve the problem, wasting both time and resources.

The data collection and recovery module 300 may address these problems by focusing data collection and recovery processes on specific failures and host/device relationships, without disabling I/O activity between hosts 104 and storage devices 106 that are unrelated to the failure. This may be accomplished in many cases without performing a warmstart. By focusing on specific failures, rather than using a "kitchen sink" approach to data collection, the data collection and recovery module 300 may significantly reduce the amount of data that is collected to analyze and resolve a failure.

In selected embodiments, the data collection and recovery module 300 may include one or more of a data collection and recovery table 302, a detection module 304, a location module 306, a pre-data-collection module 308, a data collection module 310, a recovery module 312, a maintenance module 314, a count module 316, a threshold module 318, and a reset module 320. The term "table" is defined broadly herein to include any table, matrix, array, file, or data structure for arranging data. The illustrated modules are presented only by way of example. For example, some embodiments of the invention may include more or fewer modules than those illustrated in FIG. 3.

The data collection and recovery table 302 may store one or more entries 322. Each entry 322 may correspond to a particular failure condition. In certain embodiments, each entry 322 may describe data structures and traces to be collected and recovery processes to be executed in response to a particular failure condition. Since failure conditions may differ, actions taken in response to the failure conditions may also differ. Furthermore, since a failure may be associated with a specific host 104 and a specific storage device 106, action may be taken for the specific host 104 and storage device 106 while allowing I/O to continue between hosts 104 and storage devices 106 not associated with the failure. Several examples of entries 322 and information contained in the entries 322 are described in association with FIGS. 4 and 6.

In selected embodiments, a detection module 304 may detect and identify a failure condition in the storage controller 102. For example, where the storage controller 102 is an IBM enterprise storage controller, the detection module 304 may detect and identify a failure condition such as a microcode detected error (MDE) or microcode logic error (MLE). The detection module 304 may also identify host(s) 104 and/or storage device(s) 106 that are associated with the failure condition. This may be accomplished, for example, by identifying host(s) 104 and/or storage device(s) 106 that were actively performing I/O when the failure condition occurred.

A location module 306 may locate an entry 322 in the data collection and recovery table 302 that corresponds to the detected failure condition. This may be accomplished, for example, by determining a failure ID (such as an MDE or MLE number) associated with the failure condition and then locating an entry 322 in the table 302 by locating the failure ID. Thus, in selected embodiments, a failure ID may provide an index to the data collection and recovery table 302, although other indexing methods are also possible. The failure ID will be discussed in more detail hereafter.

A pre-data-collection module 308 may initiate processes to execute prior to and/or while the data collection process is executing. For example, the pre-data-collection module 308 may cause the storage controller 102 to return a "busy" signal in response to all host I/O to the storage device 106 associated with the failure condition while data is being collected. For example, in an IBM S/390 host and storage device relationship, the storage controller 102 may present CU BUSY status (control unit busy status) in response to I/O from any host 104 until all necessary state-save data is collected.

A data collection module 310 may initiate processes for collecting state-save data 324 associated with the failure condition. For example, the data collection module 310 may collect data structures 326, component-specific traces 328 (i.e., traces specific to a particular hardware or software component), global traces 330, or other data that may be helpful to analyze, fix, or resolve the failure condition. Unlike the data collection that may occur during a warmstart, the data collection module 310 may collect state-save data that is specific to the particular failure condition. This will likely reduce the amount of data that is collected, saving both time and resources, and potentially accelerate any response to the problem since the data may be transmitted to the appropriate individual or service center and analyzed in a more expeditious manner.

A recovery module 312 may be used to invoke recovery processes (as identified in the corresponding failure condition entry 322) associated with the failure condition. The recovery process may include all actions or operations needed to recover from the failure. In certain embodiments, this may include causing the storage controller 102 to return a "busy" signal in response to all host I/O to the storage device 106 associated with a failure condition while the recovery processes are executing.

A maintenance module 314 may be used to maintain communication between hosts 104 and storage devices 106 not related to the failure condition while the other modules 304, 306, 308, 310, 312, 316, 318, 320 are operating. Thus, devices 104, 106 not associated with the failure condition may continue to operate while the failure is being handled.

In selected embodiments, a count module 316 may be used to count and update a count value reflecting the number of times a particular error condition has occurred. This may be helpful to determine the severity or frequency of the problem and take a more appropriate response. For example, if a problem is recurring, an escalated recovery process such as a warmstart or failover may be needed. In selected embodiments, a threshold module 318 may be use to invoke an escalated recovery process when the count value has reached a threshold value. For example, a warmstart or failover may be performed if the count value reaches a particular threshold value. A reset module 320 may be used to reset the count value once the escalated recovery process is invoked.

As mentioned, escalated recovery processes may include warmstarts and failovers, with the failover typically being the more severe response. In selected embodiments, a warmstart module 332 may be used to perform a warmstart in the event the count value reaches the threshold value. The warmstart module 332 may include a data collection module 334 and a recovery module 336. The data collection module 334 may collect state-save data, which will typically be larger in size and more comprehensive than the state-save data collected by the data collection module 310 in the data collection and recovery module 300. Similarly, the recovery module 336 may invoke recovery processes associated with a warmstart. This may include temporarily suspending I/O between all hosts 104 and all storage devices 106, regardless of whether they were associated with the failure condition or not.

Similarly, a failover module 338 may be used to perform a failover operation in the event a server 108 cannot recover from a failure condition using a focused recovery process or a warmstart. The failover may be more severe than any of the other responses and may include shutting down one of the servers 108a and operating exclusively with the other server 108b. This operation may continue until corrective action is taken.

Figure 4:
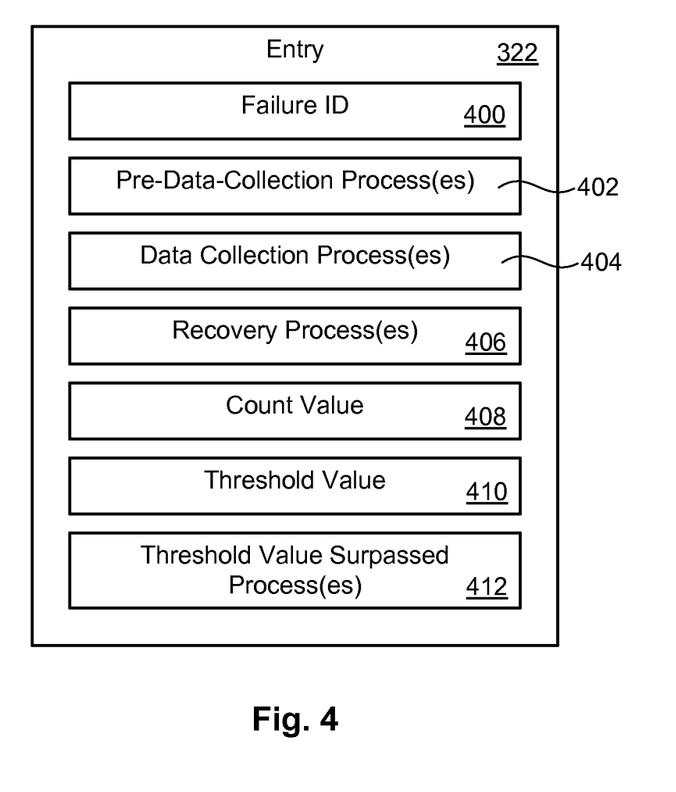
FIG. 4 is a high-level block diagram showing one example of an entry in a data collection and recovery table.

Referring to FIG. 4, one embodiment of an entry 322 (or record 322) in the data collection and recovery table 302 is illustrated. As mentioned, each entry 322 may correspond to a particular failure condition. Each entry 322 may contain a number of fields, although each field may be populated differently. These fields are presented only by way of example and are not intended to be limiting.

In the illustrated embodiment, each entry 322 includes a field 400 storing a failure ID. This failure ID may include a unique identifier (such as an MDE or MLE number) associated with a particular error or failure condition. The entry 322 may also include a field 402 associated with one or more pre-data-collection processes. This field 402, for example, may store pointers to pre-data-collection processes to execute before or while collecting data associated with the failure condition. The entry 322 may also include a field 404 associated with one or more collection processes. This field 404 may indicate which data structures and/or traces to collect, or may store pointers to processes used to collect such data. In selected embodiments, the data collected may be a subset of data collected during a warmstart, thereby reducing the amount of data collected.

The entry 322 may also include a field 406 associated with one or more recovery processes. This field 406, for example, may store pointers to processes used to recover from a particular failure. This field 406 may also optionally store pointers to processes to execute while the server 108 is recovering. For example, this field 406 may point to a process to return a "busy" signal in response to all host I/O to a storage device 106 associated with a failure condition.

In selected embodiments, the entry 322 may also store a count value 408. As previously mentioned, this count value 408 may be incremented or modified each time a failure associated with the entry 322 occurs. When the count value 408 reaches a threshold value 410, a more drastic measure such as an escalated recovery process (e.g., a warmstart or failover) may be executed. For example, one benefit of a warmstart is that it may reset certain data structures. In selected embodiments, a field 412 may be associated with one or more escalated recovery processes. Like the previous examples, this field 412 may, in certain embodiments, store pointers to these escalated recovery processes.

It should be recognized that some of the fields in the entry 322 may be empty in certain circumstances. For example, it may be desirable to collect data for certain failures without executing any recovery process. In other cases, it may be desirable to execute recovery processes without collecting any data. For example, if a command sent by a host 104 is rejected by a storage device 106, this may cause the application that generated the command to terminate in the host 104, causing an error or failure condition in the host 104. The host 104 may not have any way to initiate a warmstart or other action in the storage controller 102 (which could be used to collect data indicating why the command was rejected).

In selected embodiments, an entry 322 may be included in the table 302 for such a rejected command. This entry 322 may be used to initiate data collection in the storage controller 102 in the event the command is rejected. In such cases, data may be collected in the storage controller 102 (in order to analyze the problem) without initiating any recovery processes in the storage controller 102 (since the problem is in the host 104). In other embodiments, the data collection and recovery module 300 may be configured to initiate data collection and/or recovery processes in response to other commands or actions initiated by the host 104.

Figure 5:
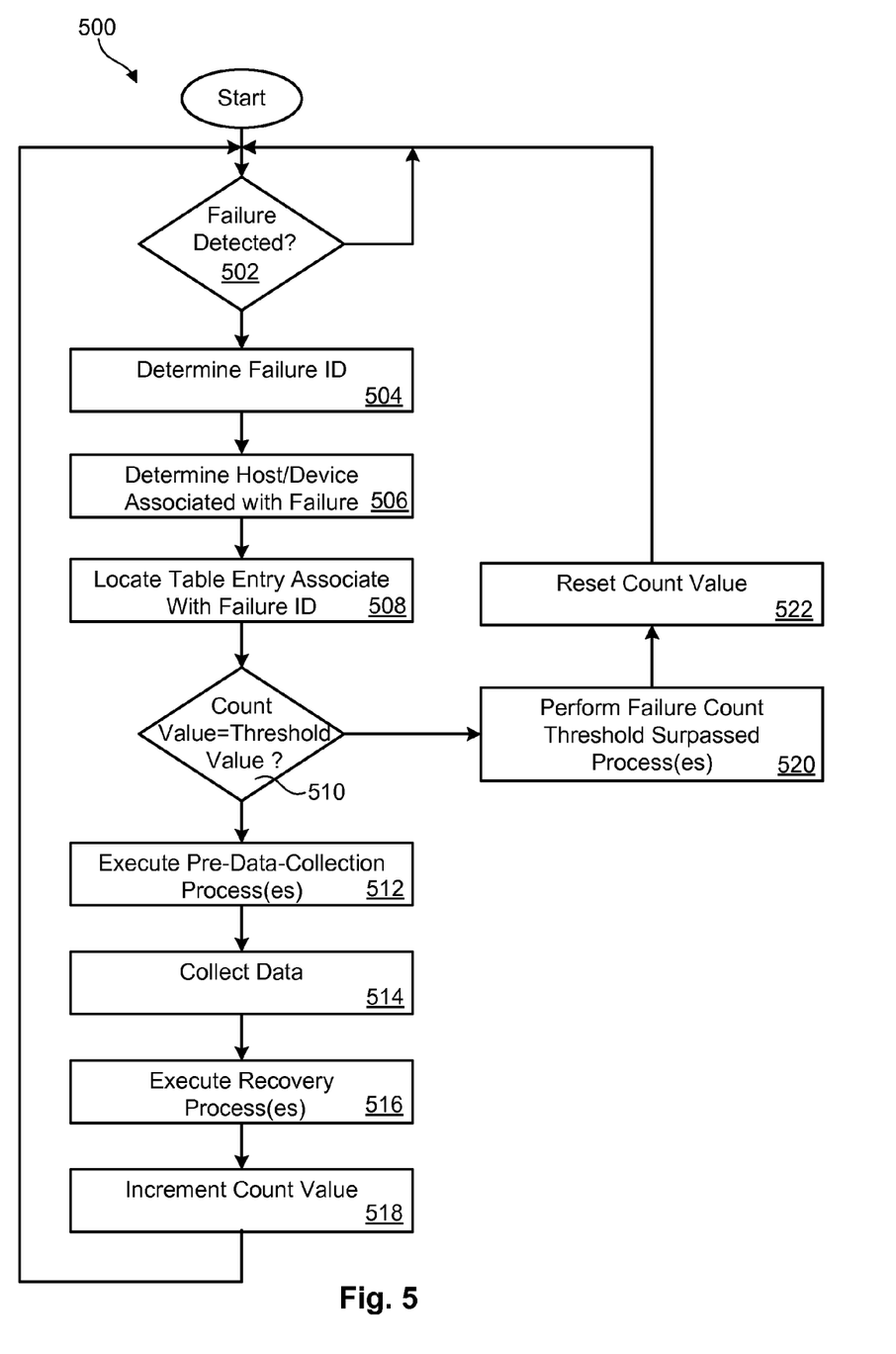
FIG. 5 is a flow chart showing one example of a method for handling a failure condition in the storage controller.

Referring to FIG. 5, one embodiment of a method 500 for handling a failure condition in a storage controller 102 is illustrated. In this embodiment, the method 500 may continually check 502 for the occurrence of a failure condition. If a failure has occurred, the method 500 may determine 504 a failure ID (such as an MDE or MLE number) associated with the failure condition. The method 500 may also determine 506 which host(s) 104 and storage devices 106 are associated with the failure condition. The method 500 may then locate 508, using the failure ID, an entry 322 in the data collection and recovery table 302 that corresponds to the failure condition.

At this point, the method 500 may compare 510 the count value 408 in the entry 322 to the threshold value 410. If the count value is not equal to the threshold value, the method 500 may execute 512 any pre-data-collection process(es) and collect 514 any data that is indicated in the entry 322. The method 500 may also execute 516 any recovery process(es) that are indicated in the entry 322. The method 500 may then increment 518 the count value.

On the other hand if, at the decision step 510, the count value 408 is equal to the threshold value 410, the method 500 may execute 520 any escalated recovery processes that are indicated in the entry 322. This may include, for example, initiating a warmstart or failover operation. The method 500 may then reset 522 the count value 408.

Figure 6:
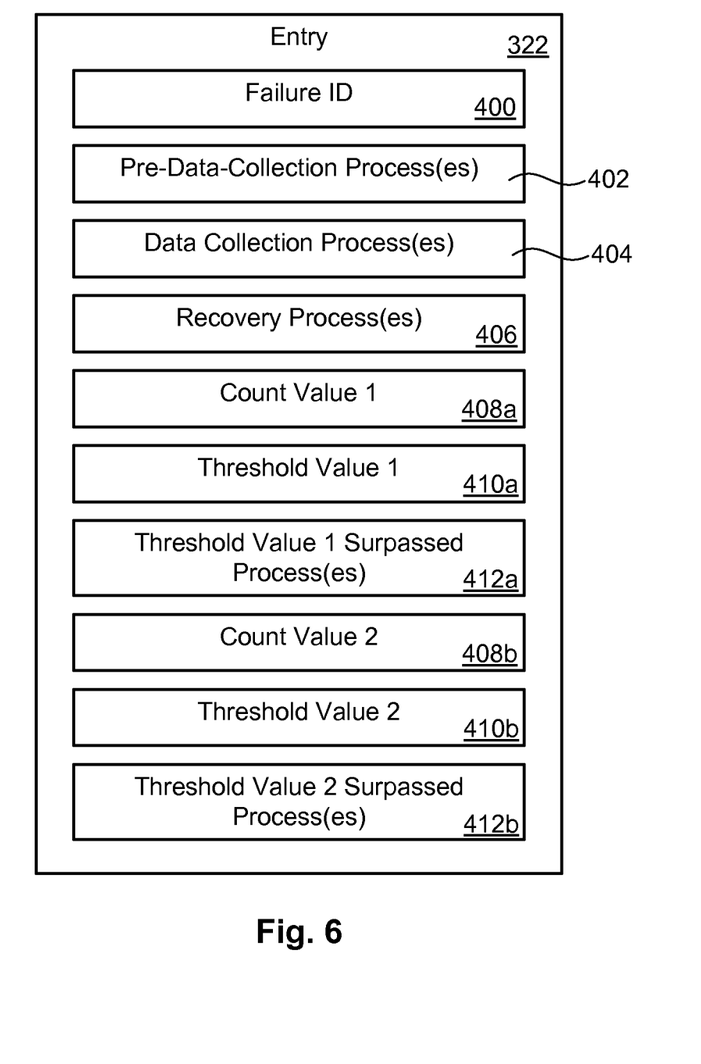
FIG. 6 is a high-level block diagram showing another example of an entry in the data collection and recovery table.

Referring to FIG. 6, another embodiment of an entry 322 (or record 322) in the data collection and recovery table 302 is illustrated. Like the previous example, the entry 322 may include fields 400, 402, 404, 406 associated with a failure ID, pre-data-collection process(es), data collection process(es), and recovery process(es). However, unlike the entry 322 described in FIG. 4, the entry 322 may store multiple count values 408a, 408b, multiple threshold values 410a, 410b, and multiple fields 412a, 412b for different escalated recovery processes. The first count value 408a may be incremented or modified each time the failure associated with the entry 322 occurs. When the first count value 408a reaches a first threshold value 410a, a first escalated recovery process (as indicated in the field 412a), such as a warmstart, may be executed. Similarly, a second count value 408b may be incremented or modified each time the first escalated recovery process 412a is executed. When the second count value 408b reaches a second threshold value 410b, a second escalated recovery process (as indicated in the field 412b), such as a failover operation, may be executed. This embodiment allows more drastic measures to be taken if a failure condition continues to reoccur.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to handle a failure condition in a storage controller, the storage controller enabling one or more host devices to access data in one or more storage devices, the method comprising:

detecting a failure condition in the storage controller;
 identifying a specific host-device/storage-device relationship associated with the failure condition;
 determining a failure ID associated with the failure condition;
 locating, in a table using the failure ID, an entry identifying a set of data structures and traces to collect and a recovery process to execute on the storage controller in response to the failure condition;
 collecting the set of data structures and traces identified in the entry for the specific host-device/storage-device relationship;
 executing the recovery process on the storage controller for the specific host-device/storage-device relationship; and
 while collecting the set of data structures and traces and executing the recovery process, suspending I/O between the specific host device and storage device associated with the failure condition, while maintaining, through the storage controller, I/O between host devices and storage devices not associated with the failure condition.

2. The method of claim 1, further comprising monitoring the number of times the failure condition occurs.

3. The method of claim 2, further comprising executing an escalated recovery process if the number of times exceeds a threshold value.

4. The method of claim 3, wherein the escalated recovery process is a warmstart.

5. The method of claim 3, wherein the escalated recovery process is a failover.

6. The method of claim 1, further comprising executing a pre-data-collection process on the storage controller for the specific host-device/storage-device relationship prior to and while collecting the set of data structures and traces.

7. The method of claim 6, wherein executing the pre-data-collection process comprises causing the storage device associated with the specific host-device/storage-device relationship to return a busy signal in response to I/O from any host.

8. The method of claim 1, wherein executing the recovery process further comprises causing the storage device associated with the specific host-device/storage-device relationship to return a busy signal in response to I/O from any host.

9. The method of claim 1, wherein the at-least one table stores pointers to processes used to collect the data structures and traces and recover from the failure condition.

10. The method of claim 1, wherein the traces comprise at least one of component-specific traces and global traces.

11. An apparatus to handle a failure condition in a storage controller, the storage controller enabling one or more host devices to access data in one or more storage devices, the apparatus comprising:
a storage controller storing modules for execution thereon, the modules comprising:
a detection module to detect a failure condition in the storage controller;
the detection module further configured to identify a specific host-device/storage-device relationship associated with the failure condition;
a determination module to determine a failure ID associated with the failure condition;
a location module to locate, in a table using the failure ID, an entry identifying a set of data structures and traces to collect and a recovery process to execute on the storage controller in response to the failure condition;
a data collection module to collect the set of data structures and traces identified in the entry for the specific host-device/storage-device relationship;
a recovery module to execute the recovery process on the storage controller for the specific host-device/storage-device relationship; and
a maintenance module to, while collecting the set of data structures and traces and executing the recovery process, suspend I/O between the specific host device and storage device associated with the failure condition, while maintaining I/O between host devices and storage devices not associated with the failure condition.

12. The apparatus of claim 11, further comprising a count module to monitor the number of times the failure condition occurs.

13. The apparatus of claim 12, further comprising a threshold module to invoke an escalated recovery process if the number of times exceeds a threshold value.

14. The apparatus of claim 11, wherein the table stores pointers to processes used to collect the data structures and traces and recover from the failure condition.

15. The apparatus of claim 11, where the traces comprise at least one of component-specific traces and global traces.

16. A computer program product to handle a failure condition in a storage controller, the computer program product comprising a non-transitory computer-usable storage medium having computer-usable program code embodied therein, the computer-usable program code comprising:
computer-usable program code to detect a failure condition in a storage controller;
computer-usable program code to identify a specific host-device/storage-device relationship associated with the failure condition;
computer-usable program code to determine a failure ID associated with the failure condition;
computer-usable program code to locate, in a table using the failure ID, an entry identifying a set of data structures and traces to collect and a recovery process to execute on the storage controller in response to the failure condition;
computer-usable program code to collect the set of data structures and traces identified in the entry for the specific host-device/storage-device relationship;
computer-usable program code to execute the recovery process on the storage controller for the specific host-device/storage-device relationship; and
computer-usable program code to, while collecting the set of data structures and traces and executing the recovery process, suspend I/O between the specific host device and storage device associated with the failure condition, while maintaining I/O between host devices and storage devices not associated with the failure condition.

17. The computer program product of claim 16, further comprising computer-usable program code to monitor the number of times the failure condition occurs.

18. The computer program product of claim 17, further comprising computer-usable program code to execute an escalated recovery process if the number of times exceeds a threshold value.

19. The computer program product of claim 16, wherein the table stores pointers to processes used to collect the data structures and traces and recover from the failure condition.

20. The computer program product of claim 16, where the traces comprise at least one of component-specific traces and global traces.

* * * * *